United States Patent
Siboni et al.

(10) Patent No.: US 9,586,363 B2
(45) Date of Patent: Mar. 7, 2017

(54) METHOD AND APPARATUS FOR ADHESION OF INSERTS

(71) Applicant: Zephyros, Inc., Romeo, MI (US)

(72) Inventors: Patrick Siboni, Les Granges (FR); John Blancaneaux, Fegersheim (FR)

(73) Assignee: ZEPHYROS, INC., Romeo, MI (US)

( * ) Notice: Subject to any disclaimer, the term of this patent is extended or adjusted under 35 U.S.C. 154(b) by 188 days.

(21) Appl. No.: 14/505,892

(22) Filed: Oct. 3, 2014

(65) Prior Publication Data

US 2015/0096678 A1   Apr. 9, 2015

Related U.S. Application Data

(60) Provisional application No. 61/886,828, filed on Oct. 4, 2013.

(51) Int. Cl.
*A41H 37/00* (2006.01)
*A44B 19/00* (2006.01)
(Continued)

(52) U.S. Cl.
CPC ............ *B29C 65/4815* (2013.01); *B32B 3/12* (2013.01); *B32B 7/00* (2013.01); *B32B 7/02* (2013.01);
(Continued)

(58) Field of Classification Search
CPC ..... F16B 5/01; B29C 65/4815; B29C 65/486; B29C 65/561; B29C 65/72;
(Continued)

(56) References Cited

U.S. PATENT DOCUMENTS 625,559 A    5/1899 Keeler
3,317,471 A    5/1967 Johnson et al.
(Continued)

FOREIGN PATENT DOCUMENTS

DE    3012288 A1    10/1981
EP    1356911 A2    10/2003
(Continued)

OTHER PUBLICATIONS

PCT Search Report & Written Opinion dated Mar. 23, 2015; Application No. PCT/US2014/059023.
(Continued)

*Primary Examiner* — Philip Tucker
*Assistant Examiner* — Brian R Slawski
(74) *Attorney, Agent, or Firm* — The Dobrusin Law Firm, P.C.

(57) ABSTRACT

The present invention contemplates a method for the attachment of a component to a honeycomb structure comprising forming a cavity in the honeycomb structure whereby the cavity is formed within one or more honeycomb cells; placing an insert adapted to enable the attachment of the component to the honeycomb structure whereby a reformable epoxy resin adhesive is injected about the insert or an expandable reformable epoxy resin adhesive is overmolded onto the insert; heating the reformable epoxy resin adhesive; and hardening and adhering the reformable epoxy resin adhesive to one or more interior walls of the cavity upon cooling.

20 Claims, 2 Drawing Sheets

(51) Int. Cl.
*B29C 65/00* (2006.01)
*B32B 37/00* (2006.01)
*C09J 163/00* (2006.01)
*B32B 3/12* (2006.01)
*B29C 65/48* (2006.01)
*C09J 5/06* (2006.01)
*E04C 2/36* (2006.01)
*F16B 5/01* (2006.01)
*B32B 7/00* (2006.01)
*B32B 7/02* (2006.01)
*B32B 7/12* (2006.01)
*B32B 27/38* (2006.01)
*F16B 37/04* (2006.01)
*B29C 65/54* (2006.01)
*B32B 37/14* (2006.01)
*B29K 63/00* (2006.01)
*F16B 11/00* (2006.01)

(52) U.S. Cl.
CPC .............. *B32B 7/12* (2013.01); *B32B 27/38* (2013.01); *C09J 5/06* (2013.01); *E04C 2/365* (2013.01); *F16B 5/01* (2013.01); *F16B 37/048* (2013.01); *B29C 65/542* (2013.01); *B29C 66/474* (2013.01); *B29C 66/72525* (2013.01); *B29K 2063/00* (2013.01); *B32B 37/146* (2013.01); *B32B 2250/40* (2013.01); *B32B 2605/00* (2013.01); *B32B 2605/18* (2013.01); *C09J 2463/00* (2013.01); *F16B 11/006* (2013.01)

(58) Field of Classification Search
CPC ............ B29C 66/72525; B29C 65/542; B29C 66/7254; B29C 66/474; Y10T 16/05; Y10T 428/24149; B32B 3/12; B32B 27/38; B32B 37/146; B32B 2037/1215
USPC ....... 156/60, 66, 91, 92, 152, 247, 293, 297, 156/298, 303.1, 330; 428/73, 116, 117, 428/118
See application file for complete search history.

(56) References Cited

U.S. PATENT DOCUMENTS

| | | |
|---|---|---|
| 3,473,950 A | 10/1969 | Wong |
| 3,485,282 A | 12/1969 | Lopez et al. |
| 4,093,491 A * | 6/1978 | Whelpton ............ B29C 65/18 156/293 |
| 4,438,254 A | 3/1984 | Doorakian et al. |
| 4,507,461 A | 3/1985 | Bowditch |
| 4,612,156 A | 9/1986 | Heinemeyer et al. |
| 4,647,648 A | 3/1987 | Silvis et al. |
| 4,800,643 A | 1/1989 | Higgins |
| 4,981,735 A * | 1/1991 | Rickson ............... F16B 5/01 156/92 |
| 5,089,588 A | 2/1992 | White et al. |
| 5,115,075 A | 5/1992 | Brennan et al. |
| 5,134,201 A | 7/1992 | Billovits et al. |
| 5,164,472 A | 11/1992 | White et al. |
| 5,240,543 A | 8/1993 | Fetterhoff et al. |
| 5,266,133 A | 11/1993 | Hanley et al. |
| 5,275,853 A | 1/1994 | Silvis et al. |
| 5,401,814 A | 3/1995 | Schomaker et al. |
| 5,464,924 A | 11/1995 | Silvis et al. |
| 5,686,551 A | 11/1997 | White et al. |
| 5,708,042 A | 1/1998 | Hasegawa |
| 5,731,094 A | 3/1998 | Brennan et al. |
| 5,741,042 A | 4/1998 | Livingston et al. |
| 5,766,719 A | 6/1998 | Rimkus |
| 5,834,078 A | 11/1998 | Cavitt et al. |
| 5,852,163 A | 12/1998 | Chen et al. |
| 5,962,093 A | 10/1999 | White et al. |
| 5,962,621 A | 10/1999 | Beckerdite et al. |
| 6,011,111 A | 1/2000 | Brennan et al. |
| 6,180,715 B1 | 1/2001 | Schmidt |
| 6,270,600 B1 | 8/2001 | Wycech |
| 6,287,666 B1 | 9/2001 | Wycech |
| 6,365,079 B1 | 4/2002 | Winkler et al. |
| 6,376,583 B1 | 4/2002 | Winkler et al. |
| 6,391,408 B1 | 5/2002 | Hutchinson |
| 6,407,225 B1 | 6/2002 | Mang et al. |
| 6,455,116 B1 | 9/2002 | Xia et al. |
| 6,455,146 B1 | 9/2002 | Fitzgerald |
| 6,589,621 B1 | 7/2003 | Beckerdite et al. |
| 6,723,443 B2 | 4/2004 | Tsai et al. |
| 6,846,559 B2 | 1/2005 | Czaplicki et al. |
| 6,855,652 B2 | 2/2005 | Hable et al. |
| 7,125,461 B2 | 10/2006 | Czaplicki et al. |
| 7,150,902 B2 | 12/2006 | Farha |
| 7,318,873 B2 | 1/2008 | Czaplicki et al. |
| 7,581,932 B2 | 9/2009 | Coupe et al. |
| 7,784,186 B2 | 8/2010 | White et al. |
| 7,879,925 B2 | 2/2011 | Chmielewski et al. |
| 7,892,396 B2 | 2/2011 | Sheasley |
| 8,430,448 B2 | 4/2013 | Richardson et al. |
| 2002/0006755 A1 | 1/2002 | North et al. |
| 2003/0039792 A1 | 2/2003 | Hable et al. |
| 2003/0045620 A1 | 3/2003 | Carlson et al. |
| 2003/0099826 A1 | 5/2003 | Juras et al. |
| 2003/0184121 A1 | 10/2003 | Czaplicki et al. |
| 2004/0131840 A1 | 7/2004 | Ferguson et al. |
| 2004/0221953 A1 | 11/2004 | Czaplicki et al. |
| 2007/0270515 A1 | 11/2007 | Chmielewski et al. |
| 2008/0029214 A1 | 2/2008 | Hable et al. |
| 2008/0060742 A1 | 3/2008 | Sheasley et al. |
| 2009/0202294 A1 | 8/2009 | Apfel |
| 2009/0298974 A1 | 12/2009 | Chmielewski et al. |
| 2010/0289242 A1 | 11/2010 | Nitsche et al. |
| 2011/0039470 A1 | 2/2011 | Wakeman et al. |
| 2011/0220267 A1 * | 9/2011 | Blancaneaux ......... C08L 63/00 156/78 |
| 2011/0278802 A1 | 11/2011 | Nitsche et al. |
| 2012/0251863 A1 | 10/2012 | Berger et al. |
| 2013/0020019 A1 | 1/2013 | Nogues et al. |
| 2015/0096663 A1 | 4/2015 | Siboni et al. |
| 2015/0096678 A1 | 4/2015 | Siboni et al. |
| 2016/0046047 A1 | 2/2016 | Gleyal et al. |
| 2016/0229965 A1 | 8/2016 | Chmielewski et al. |

FOREIGN PATENT DOCUMENTS

| | | |
|---|---|---|
| EP | 1607204 A2 | 12/2005 |
| EP | 1916285 A1 | 4/2008 |
| JP | H11348160 A | 12/1999 |
| WO | 95/25005 | 9/1995 |
| WO | 98/14498 | 4/1998 |
| WO | 98/36944 | 8/1998 |
| WO | 00/46017 | 8/2000 |
| WO | 2005/058573 A1 | 6/2005 |
| WO | 2007/008569 A1 | 1/2007 |
| WO | 2007/117663 A2 | 10/2007 |
| WO | 2008/010823 | 1/2008 |
| WO | 2008/016889 A1 | 2/2008 |
| WO | 2009/058295 A2 | 5/2009 |
| WO | 2009/124709 A1 | 10/2009 |
| WO | 2009/127638 | 10/2009 |
| WO | 2010/040499 A1 | 4/2010 |
| WO | 2010/054194 | 5/2010 |
| WO | 2010/071525 A1 | 6/2010 |
| WO | 2011/141148 A2 | 11/2011 |
| WO | 2016/130180 A1 | 8/2016 |

OTHER PUBLICATIONS

PCT Search Report & Written Opinion dated Jan. 20, 2010; Application No. PCT/EP2009/007157.
PCT International Preliminary Report on Patentability dated Jan. 20, 2016; Application No. PCT/US2014/059023.

(56) References Cited

OTHER PUBLICATIONS

Opposition for European Patent No. 1790554B1; dated Jun. 20, 2012.
Original Opposition Notice dated Mar. 7, 2012.
Opposition for European Patent No. 1790554 (translation).
European Communication dated Dec. 18, 2014; Appln. No. 09744323.8.
Chinese Office Action dated Jun. 9, 2014; Appln. No. 200980142719.6.
PCT Written Opinion of the International Preliminary Examining Authority dated Mar. 9, 2015; Application No. PCT/US2014/059023.
H. Craig Silvis & Jerry E. White "Synthesis and Properties of Thermoplastic Poly(amino ether) Barrier Resins"; Polymer News, 1998, vol. 23, pp. 6-10.
"New Dow Resins Combine Qualities of Epoxies and Thermoplastics"; Beverage Online dated Dec. 16, 1999.
New Resin on Blox Opens Avenues for Dow; Plastic News, Dec. 20, 1999, vol. 11, Issue 44, p. 4.
Specialty Monomers and Polymers, Synthesis, Properties, and Applications, 2000, Kathleen O. Havelka, ACS Symposium Series 755.
Jerry E. White "Poly (hydroxyaminoethers): A New Family of Epoxy-Based Thermoplastics"; Advanced Materials Dec. 1, 2000.
J. E. White, "Development of New Family Thermoplastics Employing poly(hydroxyamino ether) chemistry", Plastics, Rubber and Composites, 2000, vol. 29.
Susan A. Somers, "PHAE Blox Resins Produced via Reactice Extrusion; Results from a Designed Experiment on a ZSK-40 mm Co-Rotating Twin-Screw Extruder", Mar. 1, 2002, Dow Confidential Information.
Francois Constantin; "Blends of a New Thermoplastic in a Thermoset Epoxy Matrix"; Macromol Symp. 2003, 198 335-344.
Francois Constantin; "Post-Crosslinkable Blends: Reactions Between a Linear Poly(hydroxyl-amino ether) and a Diepoxy" dated Jun. 11, 2004.
Plastics Technology, "Adhesive Maker Develops Thermoplastic Epoxy WPC", dated Feb. 2009.
ICIS.Com, "Trusted Market Intelligence for the Global Chemical and Energy Industries", Dec. 16, 2002.
Jean-Pierre Pascault, "General Concepts and Epoxy Polymers", 2010.
Jerry E. White, "Thermoplastic Epoxy Polymers", 2010.
U.S. Appl. No. 62/035,677, filed Aug. 11, 2014.
U.S. Appl. No. 62/037,199, filed Aug. 14, 2014.
PCT International Search Report & Written Opinion dated Jan. 19, 2015 (Appln. No. PCT/US2014/059064).
Potentially Related U.S. Appl. No. 62/130,832, filed Mar. 10, 2015.
Potentially Related U.S. Appl. No. 62/183,380, filed Jun. 23, 2015.
Potentially Related U.S. Appl. No. 62/294,160, filed Feb. 11, 2016.
Potentially Related U.S. Appl. No. 62/296,374, filed Feb. 17, 2016.
Potentially Related U.S. Appl. No. 62/130,908, filed Mar. 10, 2015.
Potentially Related U.S. Appl. No. 62/200,380, filed Aug. 3, 2015.
Potentially Related U.S. Appl. No. 62/296,378, filed Feb. 17, 2016.
International Search Report and Written Opinion from the European Patent Office for Application No. PCT/US2015/045196, mailed Oct. 23, 2015.

\* cited by examiner

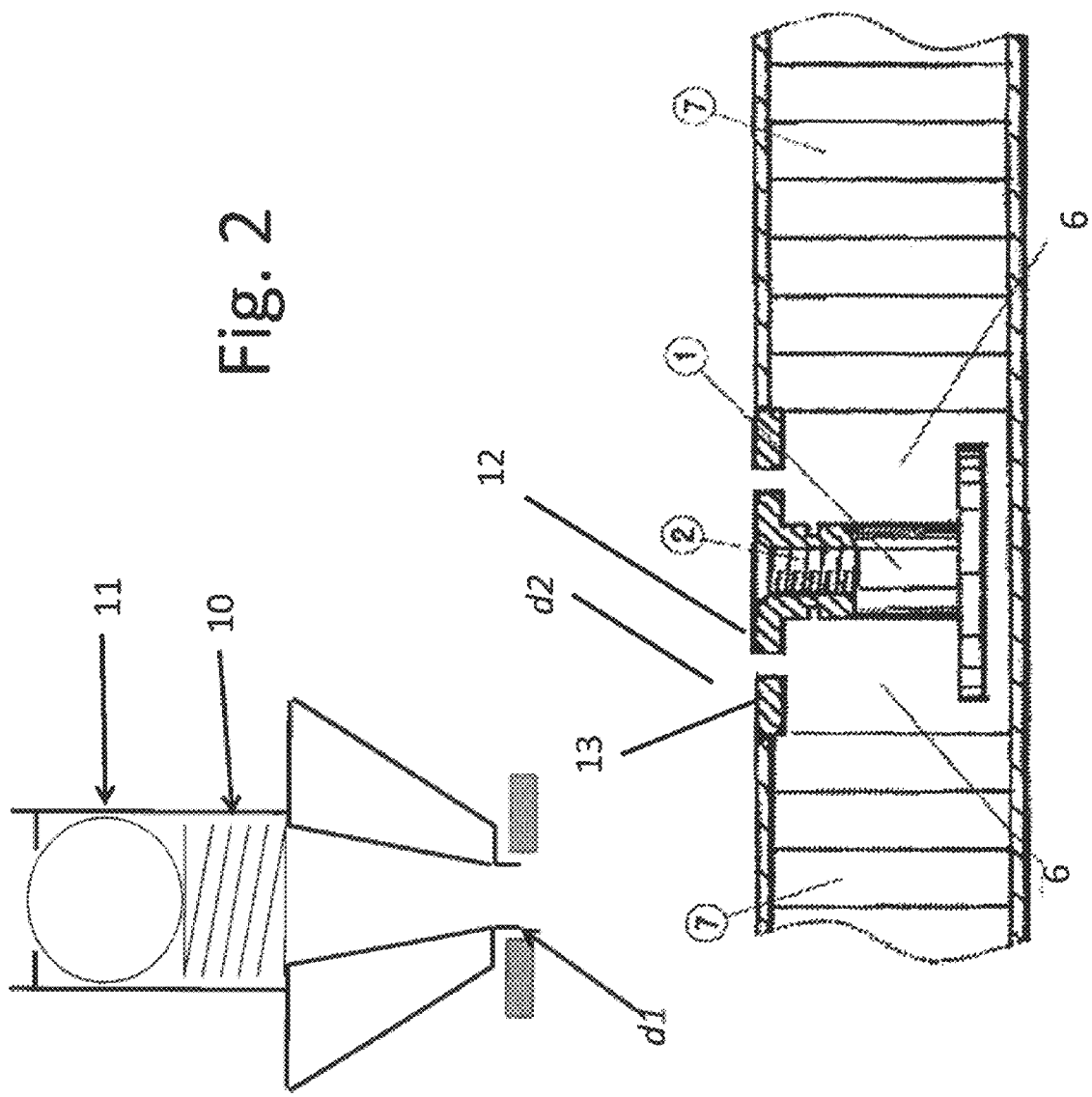

METHOD AND APPARATUS FOR ADHESION OF INSERTS

TECHNICAL FIELD

The present invention pertains generally to a method of applying a hot melt adhesive, and more particularly to a method of applying a reformable epoxy resin adhesive for use with an insert installed in a sandwich panel material.

BACKGROUND

In aerospace applications, it is common to use sandwich material, such as large honeycomb panels, and this material is often used as flooring, storage compartment doors, or internal was of aerospace vehicles. It is often necessary to provide an insert, such as one that is threaded to receive a screw to enable a hinge, bracket or other attachment. These inserts may be potted or mechanically installed in the sandwich material to allow for the fabrication of aircraft secondary structures, such as stow bins, galleys, and lavatories.

Traditionally, inserts are provided by drilling a cavity for the insert, locating the insert into the cavity, injecting a glue (which is likely a thermoset material) into the openings located onto the cap of the insert to fill the cavity drilled, leaving panels enough time to allow for the curing of the adhesive (24 hours or more) and removing the cap. Such thermoset adhesives also require significant cure time of up to 24 hours or more. Therefore, space or storage areas for these large panels is needed to allow the adhesive to cure during this time period. Other disadvantages for some thermoset adhesives include a limited shelf life or specific storage condition requirements (e.g., must be stored at cooled temperatures) or handling precautions, or require accurate mixture of 2 components.

Based upon the foregoing, there is a need for an adhesive that avoids these common problems encountered with a thermoset adhesive, such as an adhesive that is clean and fast adhering and hardening.

SUMMARY OF THE INVENTION

The present invention meets one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

In one embodiment, the present teachings envision a method for the attachment of a component to a honeycomb structure comprising forming a cavity in the honeycomb structure whereby the cavity is formed within one or more honeycomb cells and placing an insert adapted to enable the attachment of the component to the honeycomb structure within the cavity. A reformable epoxy resin adhesive may be injected into and/or about the insert, or a reformable epoxy resin adhesive may be overmolded onto the insert. The method may include additional steps of heating the reformable epoxy resin adhesive, and hardening and adhering the reformable epoxy resin adhesive to one or more interior walls of the cavity upon cooling. Unlike traditional thermoset materials, the reformable adhesive described herein may preferably be a material having thermoplastic behaviors that provide the requisite reformability of the adhesives described herein.

The present teachings further provide for a method for the attachment of a component to a honeycomb structure comprising forming a cavity in the honeycomb structure whereby the cavity is formed within one or more honeycomb cells, placing an insert adapted to enable the attachment of the component to the honeycomb structure within the cavity, heating a solid reformable epoxy resin adhesive to soften, inserting the softened reformable epoxy resin adhesive into the cavity to fill the gaps between one or more walls of the cavity and the insert, and hardening and adhering the reformable epoxy resin adhesive upon cooling to adhere the insert to the one or more walls of the cavity.

The present teachings also include a method for the attachment of a component to a honeycomb structure comprising forming a cavity in the honeycomb structure whereby the cavity is formed within one or more honeycomb cells, overmolding a reformable epoxy resin adhesive onto an insert adapted to enable the attachment of the component to the honeycomb structure, placing the insert within the cavity, heating the reformable epoxy resin adhesive, and hardening and adhering the reformable epoxy resin adhesive to one or more interior walls of the cavity upon cooling. The reformable epoxy resin adhesive may expand when heated to ensure proper filling of the cavity and adhesion to the panel walls. Thus, prior to exposure to heat the reformable epoxy resin adhesive may be expandable.

Any of the methods described above may include any of the following elements. The insert may allow for attachment of a component, the component including a hinge, clip, handle, stud, plug, lock, identification tag, or combination thereof, to the honeycomb structure. The insert may be threaded for receiving a screw. After the hardening and adhering step, the reformable epoxy resin adhesive may be heated again above its glass transition temperature, its melting temperature, or both so the insert and the one or more interior was of the cavity are debonded. The hardening and adhering step may be accomplished when the reformable epoxy resin adhesive returns to ambient temperature.

The teachings herein include inserts for panels having a reformable epoxy resin adhesive overmolded onto the insert. Also envisioned are a panel insert comprising one or more openings that receive a reformable epoxy resin adhesive.

The teachings herein provide for a reformable epoxy adhesive that has significant advantages over typical paste materials utilized for locating inserts into sandwich panel structures. The adhesive hardens quickly so that the panels do not need to be stored during adhesive cure. The adhesive leads to minimal waste and minimal mass as compared with typical pastes and can be quickly and easily applied. The adhesive can be debonded by heating the adhesive to a temperature above its glass transition temperature, its melting temperature, or both.

DESCRIPTION OF THE DRAWINGS

FIG. 2 shows an exemplary nozzle of a hot melt pressure gun and an associated sandwich panel structure and insert.

DETAILED DESCRIPTION

Figure 1:
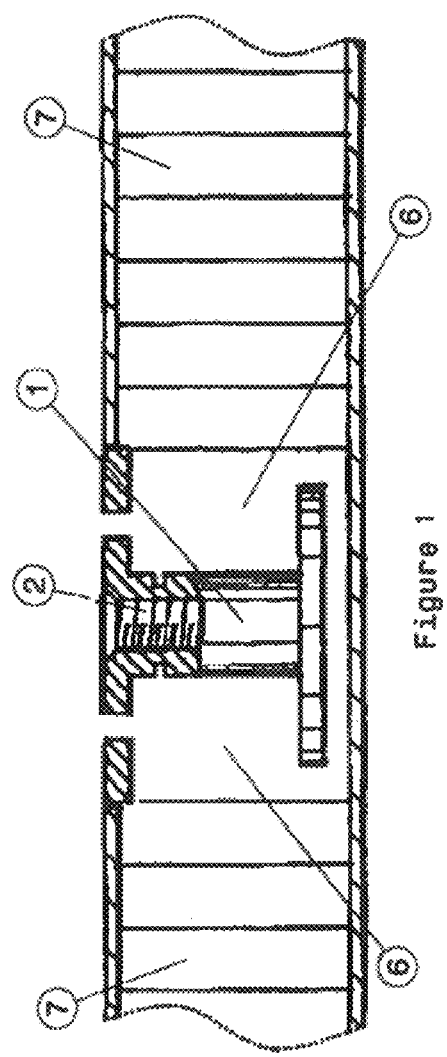
FIG. 1 shows an exemplary insert in a cavity in a honeycomb structure in accordance with the teachings herein.

The teachings herein make advantageous use of an adhesive that hardens and adheres when it cools. The teachings herein contemplate a method for providing inserts in panels such as panels used in the construction, automobile and aircraft industries, particularly in providing inserts that enable the attachment of components to sandwich panels (which may be honeycomb panels) such as the panels that are used in the interior of aerospace vehicles. It is often necessary to provide inserts in articles of manufacture perhaps to allow for attachment of products such as hinges, clips, locks, or identification plates. For example, it may be necessary to provide a threaded insert that is capable of receiving a screw to enable a hinge to be attached to the article via the insert. It will also be appreciated that many inserts can be required in a single panel. For example, two or more hinges, a latch, and an identifier may be attached to a panel.

This application claims the benefit of the filing date of U.S. Provisional Application Ser. No. 61/886,828 filed Oct. 4, 2013, the contents of this application being hereby incorporated by reference for all purposes.

The present invention provides an article comprising an article of manufacture provided with an insert, wherein the bond between the insert and the article of manufacture is provided by a reformable epoxy resin adhesive. In a preferred embodiment, the article of manufacture is a panel, particularly a panel used in the construction, automobile, or aerospace industries, including panels used in the interior of aircrafts, and the insert is used to enable attachment of a component such as a hinge, a clip, a handle, a stud, a plug, a lock, or an identification tag to the article.

In another embodiment, the present invention is used to provide the insert in a sandwich panel structure, which is the article of manufacture. Sandwich panel structures may comprise panels consisting of a core (which may be a honeycomb core) provided with two facing sheets. In this instance, the core may be of paper, fabric, plastic or metal, such as a metallic grid which may be of aluminum. Similarly, the facing may be of paper, plastic, carbon, glass fiber, metal, carbon/glass/aramide fiber reinforced thermosetting resins such as epoxy, phenolic, cyanate ester or benzoxazyne prepreg or carbon/glass/aramide fibers reinforced thermoplastic resin such as but not limited PPS, PC, PA. It is also contemplated that the facing or core may be formed from a fabric impregnated with a pre-cut thermoplastic material, which may be a thermoplastic epoxy resin material comprising a film, long fibers, tapes or fabrics.

The inserts are generally metallic parts; however, it is contemplated that specific composite inserts are also possible. In aerospace applications, the inserts are defined by National Aerospace Standards including NAS1832 through NAS1836, and installation tabs and alignment tools are defined by NAS1837.

To fit an insert within the panel, a cavity is drilled into the panel of sufficient size to receive the insert. In an exemplary embodiment, FIG. 1 shows an insert 1, provided with an internal thread 2, which is pieced in a cavity 6 in a panel structure 7. It is contemplated that the insert may be provided with an adhesive, which may be overmolded onto the insert, or may be a hot melt adhesive applied through the insert. The adhesive may be heated and then allowed to cool to securely bond the insert at the required location within the cavity in the article of manufacture. FIG. 2 shows the insert 1 and panel structure 7 and also a portion of a hot melt pressure gun 8 and a nozzle 9 associated therewith. The hot melt pressure gun is shown having a spring 10 and ball 11 for controlling adhesive exiting through the nozzle. The nozzle has a diameter d1 that can be adjusted to match the diameter d2 of the insert openings located onto the cap and designed for injecting an adhesive.

It is contemplated that when installing the insert, the adhesive may be applied in a separate step. For example, the insert may not already be provided with an adhesive, so it is possible that the adhesive may be applied directly to the insert or directly into the cavity, such as by heating and applying the solid adhesive with a hot melt pressure gun, and immediately placing the insert into the cavity so that upon cooling, the adhesive returns to a solid state and adheres the insert within the cavity. It is also contemplated that the insert may be placed into the cavity prior to adding the adhesive, and the adhesive can then be provided with a heat gun to fill the spaces between the walls of the cavity and the insert, hardening and adhering upon cooling. An insert cap may also be utilized, whereby the cap is located over the insert and includes one or more openings. The hot melt pressure gun may be utilized to inject the reformable epoxy resin adhesive into one of the one or more openings. When the adhesive begins to exit one of the one or more openings, it may act as an indicator that the cavity is filled, such that the use of excess adhesive is avoided. The cap may be removed once the adhesive is hard enough and the adhesive adheres (e.g., in less than 30 minutes, less than 20 minutes, less than 10 minutes, or less than 5 minutes; or even less than 1 minute).

In another embodiment, it is contemplated that the insert can include the adhesive, such as overmolding the adhesive onto the insert. In this case, the adhesive and the insert can be heated to soften or melt the adhesive, and then the insert and melted adhesive can be inserted into the cavity. In this case, the reformable epoxy adhesive has to be formulated in a way to slightly expand to entirely fill the cavity and adhere to the walls. Alternatively the overmolded insert can be heated once located in the cavity (ie by induction directly to the metallic insert or by induction on the adhesive filled with metallic fillers). Once the heat is removed, the adhesive will return to a solid state upon cooling, developing adhesion between the insert and the walls of the cavity of the sandwich panel structure.

It is contemplated that the adhesive can be a reformable epoxy resin adhesive. Such reformable epoxy resin materials are advantageous as they allow for significantly faster hardening and adhesion, thereby reducing the need for extended periods of time and large areas of space for curing adhesives in large panels. Because of the faster hardening time, this may also reduce or eliminate the need for means to apply pressure and hold the insert in place while the adhesive is returning to a solid state. While reformable epoxy resin adhesives may be workable at ambient temperature, it is often desirable to have a heat applying step to soften or melt the adhesive to allow it to move or become more workable. Adhesion, hardening, and returning to a solid state upon cooling of the reformable epoxy resin adhesive begins almost immediately after heating is stopped and full adhesion can occur within about 10 seconds to about 60 seconds (e.g., about 30 seconds). It is contemplated that allowing the adhesive to return to ambient temperature is sufficient for adhesion, and additional hardening steps such as cooling steps are possible, but not necessary.

In addition, a reformable epoxy resin adhesive may be desirable because of its long shelf life. It also may not require storage at a refrigerated temperature, unlike some liquid adhesives. The reformable epoxy resin may also be removable with the addition of heat. There is also no need to rework the panel to be able to reposition the insert. In addition, the adhesive both bonds and debonds quickly (less than 20 minutes, less than 10 minutes or even less than 5 minutes). The adhesive provides for minimal waste (especially as compared to pumpable paste products) as only the necessary amount of adhesive can be quickly and easily applied. The adhesive requires minimal clean up and is dry to the touch. In addition, the adhesive has low odor by comparison with other adhesives (especially pumpable paste materials).

The reformable epoxy resins described herein preferably comprise bisphenol A diglycidyl ether (BADGE) and monoethanolamine and may exhibit a $T_g$ of 80° C. For some applications that may require a higher glass transition temperature ($T_g$), it is contemplated that BADGE may be replaced by an epoxy monomer with less mobility. Such epoxy monomers may include diglycidylether of fluorene diphenol or 1,6 naphthalene diepoxy. Also, it is contemplated that where fire resistance is desired, BADGE can be replaced by a brominated bisphenol A epoxy resin.

Alternatively, the reformable epoxy resin materials disclosed herein may also be known as poly(hydroxyamino ether) (PHAE) as illustrated in U.S. Pat. Nos. 5,164,472; 5,275,853; 5,401,814 and 5,464,924, all incorporated by reference herein for all purposes. Such polyethers may be prepared by reacting a diglycidyl ether of dihydric aromatic compounds such as the diglycidyl ether of bisphenol A, or a diepoxy-functionalized poly(alkylene oxide) or mixture thereof with a primary amine or a secondary diamine or a monoamine functionalized poly(alkylene oxide) or mixture thereof. Such material generally has a relatively high flexural strength and modulus—often much higher than typical polyolefins (i.e. polyethylene and polypropylene)—and has the added benefit of being melt processable at temperatures of 150 to 200° C.

In order to utilize the adhesive as a hot melt adhesive, the viscosity of the adhesive must be such that it allows for injection the adhesive from a pressurized hot melt gun device. Ideally the adhesive has a viscosity of at least 10 Pa·s and less than 400 Pa·s, and even more preferably from about 50 Pa·s to about 100 Pa·s, at a temperature of from about 80° C. to about 200° C., which is typical processing temperature for the hot melt adhesive/insert process described herein. Efforts to reduce the viscosity of the adhesive for usability resulted in brittleness upon hardening. As such, the adhesive may be toughened by making reformable epoxy resin copolymers, for example monoethalonamine and a difunctional epoxy resin and an elastomer modified with di functional epoxy end groups. Another solution is to make polymers with monoethalonamine and a difunctional epoxy resin and to add core shell rubber particles.

A heat source can be applied to soften the adhesive and allow for it to be more workable. For example, it is contemplated that the heating may occur by induction heating with metal wires within the insert, the panel, and/or the adhesive. Alternatively, it is also contemplated that metal (which may be metallic fillers) within the adhesive itself can be heated to cause the adhesive to soften. Other methods of heating the adhesive are also possible.

With the reformable epoxy resin adhesive as disclosed herein, it is also possible that the bond formed between the adhesive and the substrates such as the insert and/or the panel can be debonded by increasing the temperature over the adhesive $T_g$ and/or melt temperature to allow the bonded substrates to be separated.

In one specific embodiment, the adhesive described herein may be used to locate an insert within a sandwich panel for use within an aerospace vehicle. The adhesive may be injection molded or overmolded onto an insert or a portion an insert. The adhesive may be activated just prior to, during, or after locating the insert into a cavity within the panel. The adhesive must have certain strength requirements for sufficient connection between the panel and bracket.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for attachment of a component to a honeycomb structure comprising:
   i. forming a cavity in the honeycomb structure whereby the cavity is formed within one or more honeycomb cells;
   ii. placing an insert adapted to enable the attachment of the component to the honeycomb structure within the cavity whereby:
      a. a reformable epoxy resin adhesive is injected about the insert; or
      b. an expandable reformable epoxy resin adhesive is overmolded onto the insert;
   iii. heating the reformable epoxy resin adhesive; and
   iv. hardening and adhering the reformable epoxy resin adhesive to one or more interior walls of the cavity upon cooling; and
   wherein the method is free of any thermoset adhesive.

2. A method according to claim 1, wherein the insert allows for attachment of a component, the component including a hinge, clip, handle, stud, plug, lock, identification tag, or combination thereof, to the honeycomb structure.

3. A method according to claim 1, wherein the insert is threaded for receiving a screw.

4. A method according to claim 1, wherein after the hardening and adhering step, the reformable epoxy resin adhesive can be heated again above its glass transition temperature, its melting temperature, or both so the insert and the one or more interior walls of the cavity are debonded.

5. A method according to claim 1, wherein the hardening and adhering step is accomplished when the reformable epoxy resin adhesive returns to ambient temperature.

6. A method for attachment of a component to a honeycomb structure comprising:
   i. forming a cavity in the honeycomb structure whereby the cavity is formed within one or more honeycomb cells;
   ii. placing an insert adapted to enable the attachment of the component to the honeycomb structure within the cavity;
   iii. heating a solid reformable epoxy resin adhesive to soften;
   iv. inserting the softened reformable epoxy resin adhesive into the cavity to fill gaps between one or more walls of the cavity and the insert; and
   v. hardening and adhering the reformable epoxy resin adhesive upon cooling to adhere the insert to the one or more walls of the cavity; and
   wherein the method is free of any thermoset adhesive.

7. A method according to claim 6, wherein the insert allows for attachment of a component, the component including a hinge, clip, handle, stud, plug, lock, identification tag, or combination thereof, to the honeycomb structure.

8. A method according to claim 6, wherein the insert is threaded for receiving a screw.

9. A method according to claim 6, wherein after the hardening and adhering step, the reformable epoxy resin adhesive can be heated again above its glass transition temperature, its melting temperature, or both so the insert and the one or more walls of the cavity are debonded.

10. A method according to claim 6, wherein the hardening and adhering step is accomplished when the reformable epoxy resin adhesive returns to ambient temperature.

11. A method according to claim 6, wherein the method includes a hot melt pressure gun for heating and/or injecting the reformable epoxy resin adhesive.

12. A method for attachment of a component to a honeycomb structure comprising:
   i. forming a cavity in the honeycomb structure whereby the cavity is formed within one or more honeycomb cells;
   ii. overmolding an expandable reformable epoxy resin adhesive onto an insert adapted to enable the attachment of the component to the honeycomb structure;
   iii. placing the insert within the cavity;
   iv. heating the reformable epoxy resin adhesive; and
   v. hardening and adhering the reformable epoxy resin adhesive to one or more interior walls of the cavity upon cooling; and
wherein the method is free of any thermoset adhesive.

13. A method according to claim 12, wherein the insert allows for attachment of a component, the component including a hinge, clip, handle, stud, plug, lock, identification tag, or combination thereof, to the honeycomb structure.

14. A method according to claim 12, wherein the insert is threaded for receiving a screw.

15. A method according to claim 12, wherein after the hardening and adhering step, the reformable epoxy resin adhesive can be heated again above its glass transition temperature, its melting temperature, or both so the insert and the one or more walls of the cavity are debonded.

16. A method according to claim 12, wherein the hardening and adhering step is accomplished when the reformable epoxy resin adhesive returns to ambient temperature.

17. A method according to claim 12, wherein the hardening and adhering step occurs less than 20 minutes after placing the insert within the cavity.

18. A method according to claim 12, wherein the hardening and adhering step occurs less than 10 minutes after placing the insert within the cavity.

19. A method according to claim 12, wherein the hardening and adhering step occurs less than 5 minutes after placing the insert within the cavity.

20. A method according to claim 12, wherein the method is free of any panel storage step during adhesive cure.

* * * * *